March 19, 1935. A. L. JONES 1,994,473
CORING DEVICE FOR FRUIT AND THE LIKE
Filed May 20, 1932
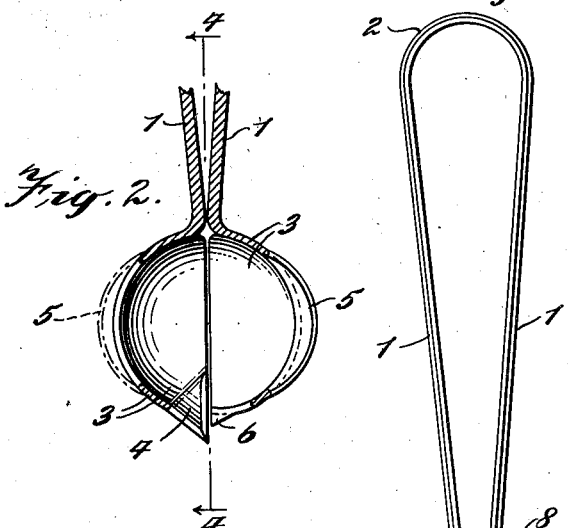
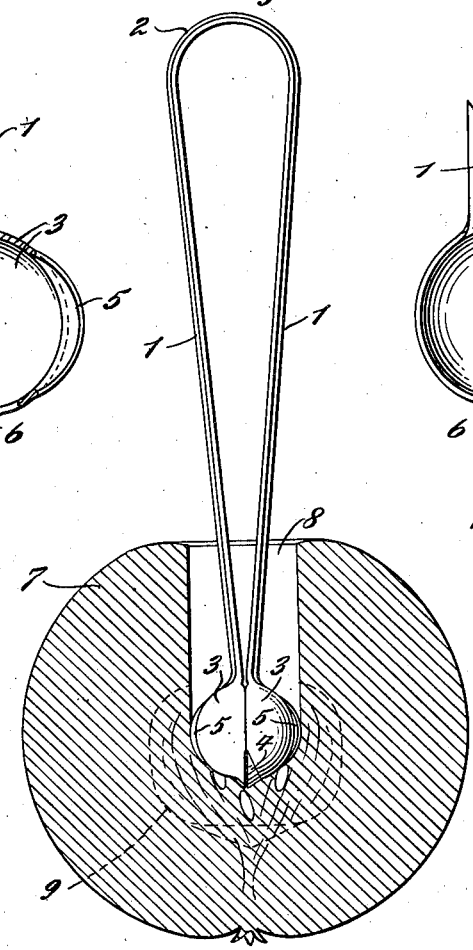
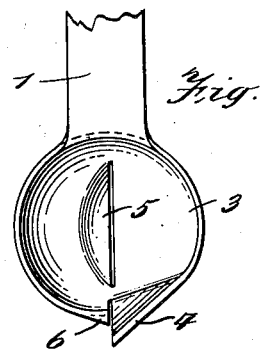
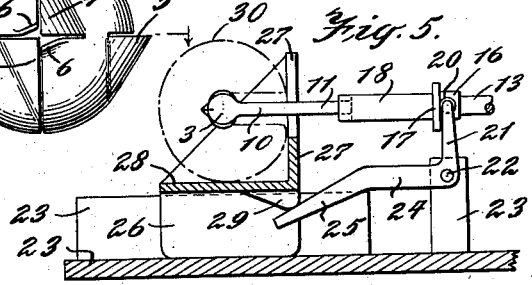
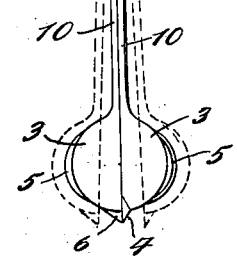
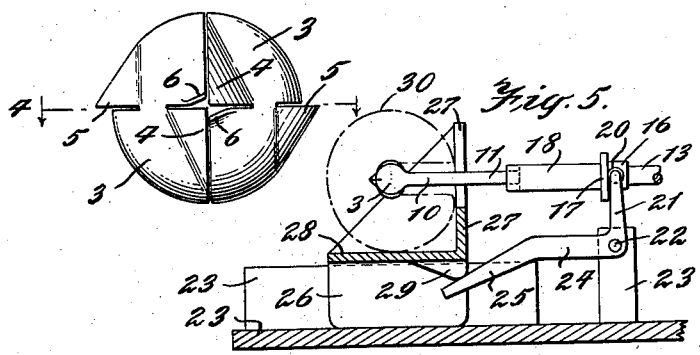
INVENTOR
Albert L. Jones
BY
William Ashley Kelly
ATTORNEY Patented Mar. 19, 1935

1,994,473

UNITED STATES PATENT OFFICE 1,994,473

CORING DEVICE FOR FRUIT AND THE LIKE

Albert L. Jones, New York, N. Y.

Application May 20, 1932, Serial No. 612,491

15 Claims. (Cl. 146—53)

This invention relates more particularly to devices for coring fruit, such as apples or pears, although it could as well be utilized if desired for boring or coring out holes or cavities in some vegetables.

With the coring devices heretofore commonly employed in coring apples, for example, it has been necessary to cut a hole entirely through the apple in order to permit the cut out core part to be removed. This not only wastes much of the good or edible part of the apple but such a hole will not securely hold flavoring or other food materials with which it may be desired to stuff the cored apple. Furthermore, if this cored out hole should be made sufficiently large to remove all of the core of the apple, then a large portion of the best edible part of the apple will also be removed at both ends of the core. On the other hand, if the core hole is made smaller, then parts of the apple core, comprising some of the hulls and often seeds, will be left in the apple, this latter being the usual practice, in order to prevent cutting away so much of the best parts of the apple with the core. Apple-coring devices have commonly been constructed to operate in this way.

An object of the present invention is to provide a coring device which is particularly adapted for removing a maximum amount of the undesirable core part of an apple or the like with the removal of only a very little of the better part, and to leave a bottom in the cored out hole or cavity, which will have a small outer or entrance opening and an enlarged undercut inner substantially central recess which has a closed bottom. Other objects of the invention are simplicity of construction, economy in manufacture, convenience in using and efficiency in operation. Other more particular objects and advantages of the invention will hereinafter appear.

In its broader aspects this invention comprehends substantially any suitable construction of coring device adapted to cut out a cavity such as above described. For example, such a device may comprise a cutter-head forming a radially projecting enlargement on the end of a rotatable stem or shank by which it is carried and which may be adjusted radially relatively to the fruit or the like while the device is in operation.

More particularly, in carrying out the invention, a pair of stem parts forming a bi-part stem or shank are provided, with each of these stem parts carrying a cutter-head, so that these cutter-heads may be adjusted radially toward and away from one another by a similar movement imparted to the cutter-carrying ends of the stem parts, the cutters being adapted to cut both inward or endwise and radially along circumferential lines, and the stem parts being mounted so as to effect such adjustment of their cutter-heads. The invention further includes various features of construction and combination of parts, as will appear from the following description, and may be embodied in either a hand-operated or power-driven device.

The embodiments of the invention shown in the accompanying drawing will now be particularly described and thereafter the invention will be pointed out in claims, reference now being had to the drawing, in which:

Fig. 1 is an elevation of a hand-operated coring device embodying the invention and shown in operative position relatively to an apple which appears in central vertical section;

Fig. 2 is an enlarged central vertical section in the plane of Fig. 1 of the cutter-head end of the device;

Fig. 3 is an inverted plan view showing the two cutter-head parts;

Fig. 4 is a central vertical section of the cutter-head end of the device taken on the lines 4—4 of Figs. 2 and 3;

Fig. 5 is a reduced side elevation with parts in vertical section of an otherwise substantially similar embodiment of the invention adapted and arranged for power operation; and Fig. 6 is an enlarged partial plan view of what is shown in Fig. 5 and further shows a spread-apart adjustment of the cutters in broken lines.

The hand-operated embodiment of the invention illustrated in Figs. 1 to 4 inclusive of the drawing will be first described. The entire coring device is shown as formed all in one piece, shaped from sufficiently thick suitable resilient sheet metal such as steel, which may be readily accomplished by ordinary pressing or stamping operations. The shank part of the device which also constitutes a handle is shown as formed by a rebent or reversely bent flat strip. This handle shank has a pair of adjacent straight stem parts 1 disposed alongside of one another, thus forming a bi-part stem. The outer end portions of these stem parts are supported and connected together by means of a cross member shown as a substantially semi-circular spring bow 2 formed in the same strip of metal with the stem parts 1. The stem parts 1 are normally urged apart and substantially into parallelism by the resilient action of the spring bow 2, and these stem parts may be readily pressed by the fingers toward and into the inclined relation with one another shown in the drawing. (Fig. 1.)

The free end of each of the stem parts 1 carries a hollow substantially spoon-shaped cutter-head 3 shown as formed in the same piece therewith. The convexly curved or rounded surface of this cutter-head projects radially beyond its stem part. These cutter-head parts are radially opposed and are disposed with their concave sides facing one another. They are shown as in general of substantially hemispherical shape, so as to present a globular form when closed together, as shown in the drawing, and thus project radially in all directions beyond the adjacent end portions of the bi-part stem formed by the two stem parts 1.

Cutting bits are provided to project from the cutter-head parts 3 and are adapted and arranged to cut both inward longitudinally of the stem parts 1 and radially outward along circumferential lines. In the construction shown each of the cutter parts 3 has a triangular cutting bit 4 struck outwardly from its edge at a point substantially opposite to its stem part 1, for boring or cutting inwardly in line with this stem part. Also each cutter-head 3 has a cutting bit 5 struck out radially therefrom, these bits in the end view of Fig. 3 appearing in triangular shape but being as a whole of curved crescent shape as will be seen from Figs. 1, 2 and 4. These bits 5 will thus cut mostly along circumferential lines, it being noted, however, that there is an overlapping of the cutting paths of the bits 4 and 5.

The cutting edges of the bits 4 and 5 are shown as disposed in planes at right angles to each other. The striking outward of the cutting bits 4 and 5 leaves openings in the cutter-heads 3 for the inward passage of the material dislodged by these bits, and it will be noted that these bits are so shaped and inclined as to direct such material to the inside of the cutter-heads. The cutting edges of the bits 4 and 5 are arranged to perform their cutting operation upon right-hand or clockwise rotation of the device as viewed from above in Fig. 1. The corners formed on the cutter-heads 3 by the bits 4 are bent outward to form projecting points 6 which facilitate penetration of the cutter-heads into the fruit or the like.

In Fig. 1 there is shown an apple 7 in an intermediate stage of being cored out by the above described device of this invention. In use and as there shown the cutter-heads 3 are held together by pressure on the outer portions of the stem parts 1 sufficient to overcome the spreading tendency of the connecting spring cross member 2. The cutter-heads 3 may then be bored into the apple 7 from its stem end to produce a cylindrical hole 8 of about the depth shown. Then the gripping pressure of the fingers upon the sides of the stem parts 1 is released, thus permitting the cutter-heads 3 to be urged apart and separated by the spring 2 while the boring operation is continued. An enlarged undercut cavity more or less of the shape and dimensions indicated by the broken line 9 may then be cut out, this cavity or recess being closed at the bottom and opening outwardly only through the reduced bore 8.

By pressing the stem parts 1 together for closing together the hollow cutter-heads the more or less disintegrated cut material may be withdrawn and emptied out whenever desired. The seeds and the fibrous material forming the core may be thus cut out and removed while leaving intact the edible parts of the apple with very little waste. Finally as a subsequent operation in the preparation of the apple or the like the enlarged cavity 9 together with the reduced bore 8 may be filled with any desired food product and to include any desired flavoring material.

The preceding description also similarly applies to the further development of the invention illustrated somewhat diagrammatically in Figs. 5 and 6. The cutter-heads being of the same construction as hereinbefore described, the same reference numerals have been applied thereto and to the parts thereof. The shank or bi-part stem also is similarly formed by a rebent spring strip in the same piece with the cutter-heads 3 but of a slightly different shape than the stem parts 1. Adjacent the cutter-heads 3 the flat stem parts have straight portions 10 which lie against each other when the cutter-heads are closed together, as shown in full lines in Fig. 6. These stem parts have slight bends therein to provide outer straight portions 11 which flare away from one another in inclined relation sufficiently to provide cam surfaces thereon longitudinally thereof. A cross member 12 shown as in the same piece with the inclined stem portions 11 connects the latter together and is joined thereto along curved lines, thereby providing springs by which in the construction shown the cutter-heads 3 are urged apart, as indicated by broken lines in Fig. 6.

A rotatable shaft 13 has its end firmly connected to the cross member 12 and extends away from the stem parts and cutter-heads 3 in line therewith. This shaft may be rotated from any suitable source of power, such as an electric motor or by means of driving mechanism to be operated by hand or including a pedal for foot operation. A slide shown as in the form of a yoke 14 has cam elements 15 which engage with the cam surfaces formed by the outer sides of the inclined stem portions 11. With these cams 15 in the position shown in full lines in Fig. 6 the cutter-heads 3 will be held together. When the slide yoke 14 is moved away from the cross member 12, as indicated by broken lines in Fig. 6, then the cutter-heads 3 will be urged apart by reason of the spring action of the resilient strip as above described.

It should be obvious from Fig. 6 that the cutter-heads 3 could be moved towards one another, instead of apart, by spring action, and in such case the cam elements 15 could be in the form of a wedge between the inclined stem parts 11 for forcing them and thus the cutter-heads 3 apart. It will also now be evident that cam elements similar to the cam elements 15 could be additionally provided on the yoke 14 at the inner sides of the stem portions 11, and in such case these stem portions 11 could then be loosely pivoted to the cross-head 12.

A collar 16 slidable along the shaft 13 has a flange 17 connected by means of side arms 18 with the slidable yoke 14, so that the latter is thereby carried by the collar 13 to slide therewith, while all of these connected parts partake of the rotation of the cutter-heads 3 and their operating shaft 13. A sufficiently strong coiled thrust spring 19 on the shaft 13 between the collar flange 17 and the cross-head member 12 normally acts upon the slide 14 to draw the cutter-heads 3 together and to restrain them against spreading apart. Rollers 20 engage with the other side of the collar flange 17 from the spring 19 and are carried by the upper ends of the forks of an upstanding lever arm 21 having a pivot pin 22 by which it is mounted on a frame 23. A forwardly extending arm 24 forms a bell-crank with the arm 21 and terminates in a forwardly and downwardly inclined portion 25 the upper side of which longitudinally thereof is shown as forming a straight cam surface.

A carriage 26 is guided to be slidable horizontally from front to rear along the frame 23. This carriage is shown as having an upstanding rear wall 27 which is slotted or notched downwardly from its upper edge as appears in Fig. 5. This carriage is also shown as provided with a horizontal web 28 forming a table portion. At its rear end beneath the rear wall 27 and table 28 the carriage carries a rounded downwardly projecting cam member 29. As the carriage 26 is moved rearward from the intermediate position thereof shown in Fig. 5, the cam 29 will slide along the cam surface of and depress the inclined lever extension 25.

Through the above described operating connections this sliding of the carriage 26 will move the cam elements 15 forward towards the cutter-heads 3, whereupon the spring-pressed cutter-heads 3 will be separated from one another and moved radially apart, as is indicated for an intermediate position of such movement by the broken lines in Fig. 6. An apple 30, shown in broken line outline in Fig. 5, may be pushed rearward against the upright slotted wall 27 thereby to move the carriage 26 with the apple. First a hole will be bored into the apple as shown, then upon further movement of the apple and carriage, the cutters 3 will be spread apart to hollow out an enlarged undercut cavity or recess.

It is obvious that various modifications may be made in the constructions shown in the drawing and above particularly described, within the principle and scope of the invention as defined in the appended claims.

I claim:

1. A coring device for fruit and the like comprising a bi-part stem, and adjacent cutters carried respectively by the ends of said stem parts, the said cutters having cutting portions shaped and positioned to cut inwardly longitudinally of the stem and also having cutting portions shaped and positioned to cut along circumferential lines radially beyond the stem, the said stem parts being mounted to be moved toward and away from one another thereby for bringing the cutters into close proximity to each other or for spreading them apart, the latter cutting portions being disposed in the radial planes in which these cutting portions move as said cutters spread apart.

2. A coring device for fruit and the like comprising a bi-part stem, and a cutter carried by each said stem part and convexly curved outward longitudinally relatively to and outwardly beyond said stem part, the said stem parts being mounted for movement toward and away from one another for adjusting the cutters to different radial positions, said cutters being disposed in the radial planes in which said cutters move to their different radial positions.

3. A coring device for fruit and the like comprising a bi-part stem, and a substantially spoon-shaped cutter carried by the free end of each stem part, each of said cutters being curved in all directions and projecting radially outward along curved lines beyond its said stem part, the said stem parts being mounted for movement of their cutter-carrying ends toward and away from one another for thereby adjusting the cutters to different radial positions, said cutters being disposed in the radial planes in which said cutters move to their different radial positions.

4. A coring device for fruit and the like comprising a bi-part stem having flattened stem parts, and a substantially hemispherical hollow cutter formed on the end of each stem part in the same piece therewith, the said stem parts being mounted for movement of their cutter ends toward and away from one another for thereby adjusting the cutters to different radial positions, said cutters being disposed in the radial planes in which said cutters move to their different radial positions.

5. A coring device for fruit and the like comprising two adjacent stem parts formed in one piece by a single reversely bent resilient strip, and a pair of adjacent substantially spoon-shaped cutters formed respectively on the ends of the stem parts in the same piece therewith, each of said cutters being curved in all directions and projecting radially outward along curved lines beyond its said stem part, the said cutters being adjustable radially toward and away from one another through the resilient bending of said strip, said cutters being disposed in the radial planes in which they are thus adjustable radially.

6. A coring device for fruit and the like comprising a pair of substantially hemispherical hollow cutter-heads disposed adjacently with their concaved sides facing one another, adjacent stem parts supporting the respective cutter-heads and providing for adjusting the latter radially toward and away from one another, and cutting bits projecting at an inclination from the cutter-heads, the latter having openings therein alongside of said bits for the inward passage of material dislodged and guided inward by the cutting bits, said cutting bits being disposed in the radial planes in which said cutter-heads have radial adjustment.

7. A coring device for fruit and the like comprising two adjacent stem parts, a pair of substantially spoon-shaped cutter-heads formed respectively on the ends of the stem parts in the same piece therewith and with their concave sides adjacently disposed, cutting bits struck out radially from the cutter-heads, and other cutting bits struck out from the cutter-heads substantially opposite their said stem parts, the said stem parts providing for adjusting the cutter-heads radially toward and away from one another.

8. A coring device for fruit and the like comprising a cutter having cutting portions shaped and positioned to cut both inward and along circumferential lines, and means for supporting the cutter so that the latter may be adjusted radially while the said device is operating so that thereby a hole may be bored with its inner portion enlarged to form an undercut cavity, said cutting portion which cuts along circumferential lines being disposed in the radial planes in which said cutter may be adjusted radially.

9. A coring device for fruit and the like comprising a plurality of adjacent cutters having cutting portions shaped and positioned to bore inwardly and also to cut along circumferential lines, and supporting means for the cutters providing for adjusting them radially toward and away from one another while the said device is in operation for thereby boring a hole and enlarging its inner portion to form an undercut cavity, said cutting portions which cut along circumferential lines being disposed in the radial planes in which said cutters have radial adjustment.

10. A coring device for fruit and the like comprising a pair of adjacent radially opposed cutters having cutting portions shaped and positioned to bore inwardly and also to cut along circumferential lines, a pair of adjacent stem parts respectively carrying the cutters and beyond which the cutters project radially, and supporting means connecting said stem parts together and acting resiliently to urge said cutters apart, said cutting portions which cut along circumferential lines being disposed in the radial planes in which said cutters are thus urged apart.

11. A coring device for fruit and the like comprising two adjacent stem parts formed in one piece by a single reversely bent resilient strip, and a pair of adjacent radially opposed cutter-heads carried respectively on the ends of the stem parts and projecting radially therefrom oppositely to one another, the said cutter-heads being urged apart from one another by the resiliency of the said strip, said cutter-heads having cutting portions disposed in the radial planes in which said cutter-heads are thus urged apart.

12. A coring device for fruit and the like comprising a pair of stem parts disposed alongside of one another, a cross member connecting together the outer end portions of the stem parts for the swinging of the stem parts toward and away from one another, a pair of radially opposed cutters carried respectively by the free ends of the stem parts and projecting radially therefrom, a rotatable shaft connected to the cross member and extending oppositely away from the stem parts, and mechanism operable by the movement of the fruit or the like for swinging the cutter-carrying stem parts for thereby moving the cutters radially toward and away from one another during the operation of the said device.

13. The invention defined in claim 12, in which the said stem parts are spring-pressed in one direction of their swinging movement and are provided longitudinally thereof with inclined cam surfaces, in combination with a collar slidable along the said shaft, a slide carried by said collar and having cam elements engaging the said cam surfaces for swinging the said stem parts in the other direction, a spring acting on the collar for normally maintaining the cutters close together by means of said cam elements, a lever engaging with the collar for moving the latter against the tension of its spring, and a slide to be moved by the fruit or the like during the operation of the device and engaging with said lever for moving the collar against its spring for thereby moving the cutters apart from one another.

14. A coring device for fruit and the like comprising two adjacent stem parts, a pair of substantially spoon-shaped cutter-heads formed respectively on the ends of the stem parts in the same piece therewith and with their concave sides adjacently disposed, and cutting bits struck out radially from the cutter-heads, the said stem parts providing for adjusting the cutter-heads radially toward and away from one another, said cutting bits being disposed in the radial planes in which said cutter-heads have radial adjustment.

15. A coring device for fruit and the like comprising two adjacent stem parts, a pair of substantially spoon-shaped cutter-heads formed respectively on the ends of the stem parts in the same piece therewith and with their concave sides adjacently disposed, and cutting bits struck out radially from the bottoms of the cutter-heads, the said stem parts providing for adjusting the cutter-heads radially toward and away from one another, said cutting bits being disposed in the radial planes in which said cutter-heads have radial adjustment.

ALBERT L. JONES.